J. W. Loveless,
Plow Fender.
No. 92,852.                    Patented July 20, 1869.
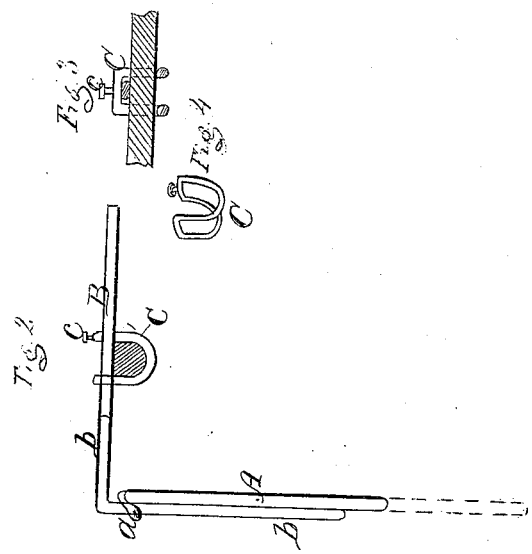
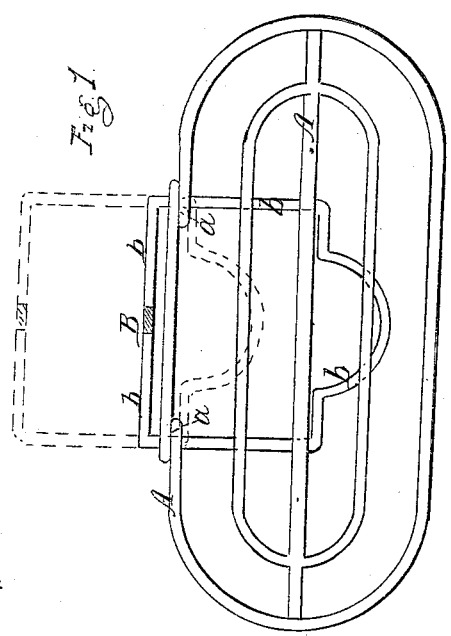
Attest                              J. W. Loveless
                                    Inventor

UNITED STATES PATENT OFFICE.

JAMES W. LOVELESS, OF CLARK'S HILL, INDIANA.

IMPROVEMENT IN CLOD-FENDERS.

Specification forming part of Letters Patent No. 92,852, dated July 20, 1869.

*To all whom it may concern:*

Be it known that I, JAMES W. LOVELESS, of Clark's Hill, in the county of Tippecanoe and State of Indiana, have invented a new and useful Improvement in Clod-Fenders; and I do hereby declare that the following is a full, clear, and exact description thereof, reference being had to the accompanying drawings, making part of this specification, in which—

Figure 1 represents a side elevation of the fender; Fig. 2, an end view of the same, showing how it is attached to a plow-beam, and the red outlines indicating the movements of the fender proper. Figs. 3 and 4 are views of the clip by means of which the fender is attached to a plow-beam.

Corresponding letters refer to corresponding parts in the several figures.

My invention relates to a plow attachment called a "clod-fender;" and it consists in the combination and arrangement of its parts; and it also consists in the construction of the clip by which it is secured to a plow-beam.

To enable those skilled in the art to make and use my invention, I will proceed to describe its construction and operation.

A in the drawings represents the fender proper, which may have an elliptical form, as shown in Fig. 1. It is to be constructed of strong wire or round iron, in such a manner that large clods of earth are not permitted to pass through its openings, while the loose earth which is thrown against its bars by the moldboard of a plow will pass freely through them. The upper portion of the outer bar is in the proper places bent so as to form the eyes $a\ a$, extending from it outwardly.

B represents the bar, on the arms $b\ b$ of which the fender is suspended, and which is held to the beam of a plow by means of the clip C, soon to be described. It consists of a flat bar of iron, of suitable length and sufficient strength, which is to be made forked at one end, its curved arms $b\ b$ being bent in a plane with it until the distance between them is equal to the distance between the eyes of the fender. The arms are then bent downward at a right angle to the bar and parallel to each other, when their ends are passed through the eyes of the fender, which works freely up and down on them for the purpose of overcoming any obstructions which may be met with. To prevent the fender from becoming disengaged from the arms, they are at the proper point again bent until they meet, where they may be welded together. It will be seen that as the arms lie against the outer face of the fender they not only serve as guides for the same, but also prevent its yielding outwardly, holding it in a nearly vertical position.

C represents the clip, which may be made of bar-iron, and is bent until it presents the form shown in Fig. 4, when the ends are welded together. One of the upper straight portions has an eye bored through it, and the same is provided with a screw-thread for the reception of a set-screw, $c$. The upper surface of the curved portions is provided with a sharp edge, as shown in Fig. 3, for the purpose of sinking them in the wood a little as it is tightened by the set-screw, thus holding it more firmly to the beam. It is to be placed over the beam from the under side, and then the bar B passed between its open jaws and between the upper surface of the beam and the straight upper portions of the clip, when the set-screw is to be screwed down on the bar. It will be seen that by this construction of the clip the operator is enabled to set the fender at any required distance from the beam of which the length of the bar B admits.

Having thus described my invention, what I claim, and desire to secure by Letters Patent, is—

1. The clip C, substantially as shown and described.

2. The combination and arrangement of the fender A, forked bar B, and clip C with reference to a plow, substantially as shown and described.

In testimony whereof I have signed my name to this specification in the presence of two subscribing witnesses.

JAMES W. LOVELESS.

Witnesses:
SAML. BOWERS,
WILLIAM LABAM.